United States Patent
Shridhar et al.

(10) Patent No.: US 6,366,937 B1
(45) Date of Patent: Apr. 2, 2002

(54) SYSTEM AND METHOD FOR PERFORMING A FAST FOURIER TRANSFORM USING A MATRIX-VECTOR MULTIPLY INSTRUCTION

(75) Inventors: Avadhani Shridhar, Santa Clara; Arindam Saha, Sunnyvale, both of CA (US)

(73) Assignee: Hitachi America Ltd., New York, NY (US)

( * ) Notice: Subject to any disclaimer, the term of this patent is extended or adjusted under 35 U.S.C. 154(b) by 0 days.

(21) Appl. No.: 09/267,899

(22) Filed: Mar. 11, 1999

(51) Int. Cl.$^7$ .................................. G06F 17/14
(52) U.S. Cl. .................................... 708/409
(58) Field of Search .......................... 708/409, 404

(56) References Cited

U.S. PATENT DOCUMENTS 4,275,452 A * 6/1981 White ........................ 708/409
4,689,762 A * 8/1987 Thibodeau, Jr. ............ 708/409
4,787,055 A * 11/1988 Bergeon et al. ............. 708/409
5,371,696 A * 12/1994 Sundararajam et al. ..... 708/409

* cited by examiner

Primary Examiner—David H. Malzahn
(74) Attorney, Agent, or Firm—Flehr Hohbach Test Albritton & Herbert LLP

(57) ABSTRACT

A system and method that implement a butterfly operation for a fast fourier transform operation in a processor using a matrix-vector-multiply instruction. A first set of inputs to the butterfly operation are defined as $r1+j\,i1$ and $r2+j\,i2$, and a twiddle factor Wn is defined as $Wn=e^{-j2\pi/N}=\cos(2\pi/N)-j\sin(2\pi/N)=a+jb$. The butterfly operation stores r1, i1, r2 and i2 in a first set of registers and stores the twiddle factor in matrix registers. The matrix-vector-multiply instruction is executed between the matrix registers and the first set of registers.

16 Claims, 8 Drawing Sheets

SYSTEM AND METHOD FOR PERFORMING A FAST FOURIER TRANSFORM USING A MATRIX-VECTOR MULTIPLY INSTRUCTION

FIELD OF THE INVENTION

This present invention relates generally to an implementation of a fast fourier transform operation in a microprocessor system, and more particularly to a system and method for performing a fast fourier transform using a matrix-vector multiply instruction.

BACKGROUND OF THE INVENTION

A fourier transform is a mathematical tool that is used to analyze continuous waveforms for repeating patterns. In particular, a fourier transform is based on the analysis of waveforms by breaking up the waveform into sinusoid functions. Sinusoid functions have a "wavy" pattern that repeats at a given frequency.

In digital systems, digital waveforms are no longer continuous but are represented by a set of samples or points. A technique called a fast fourier transform (FFT) is used to analyze the digital waveforms for repeating patterns. The FFT is applied to the input samples or points, referred to as xi and generates a set of output points, referred to as Xi. The FFT requires a certain number of calculations and uses a large amount of processor time. In a radix-2 FFT, the total number of complex multiplications and additions is N log$_2$ N, where N is the number of samples or points in the waveform. For example, an analysis of a 1,024 point waveform uses about 10,000 complex additions and multiplications. Therefore a method and system that reduces the amount of processor and computation time to perform the FFT operation is desirable.

SUMMARY OF THE INVENTION

It is an object of the present invention to provide an improved apparatus for and method of performing a fast fourier transform that reduces the computation time.

It is a further object of the invention to provide an improved method and apparatus for performing the fast fourier transform using a matrix vector multiply instruction.

It is a related object of the invention to provide a new method and apparatus for performing an inverse discrete cosine transform operation that reduces computation time using the matrix vector multiply instruction.

These and other objectives and advantages of the present invention are achieved by utilizing a matrix vector multiply instruction referred to as an FTRV instruction in a processor to perform the FFT operation. For the FFT operation, the input data and coefficients of the FFT are rearranged and stored in a vector register and matrix register, respectively. The FTRV instruction is then used to perform a butterfly operation of the FFT.

More particularly, a processor executes a butterfly operation for a fast fourier transform operation. In the butterfly operation, a first set of inputs are defined as r1+j i1 and r2+j i2, and a twiddle factor, called Wn, is defined as Wn=e$^{-j2\pi/N}$=cos($2\pi/N$)−j sin($2\pi/N$)=a+jb. A first set of registers store r1, i1, r2 and i2; and matrix registers store the twiddle factor. A matrix vector multiply operation is executed between the matrix registers and the first set of registers.

Other features and advantages of the present invention would become apparent to a person of skill in the art who studies the present invention disclosure. Therefore, a more detailed description of a preferred embodiment of the invention is given with respect to the following drawings.

DETAILED DESCRIPTION OF THE PREFERRED EMBODIMENTS

Figure 1:
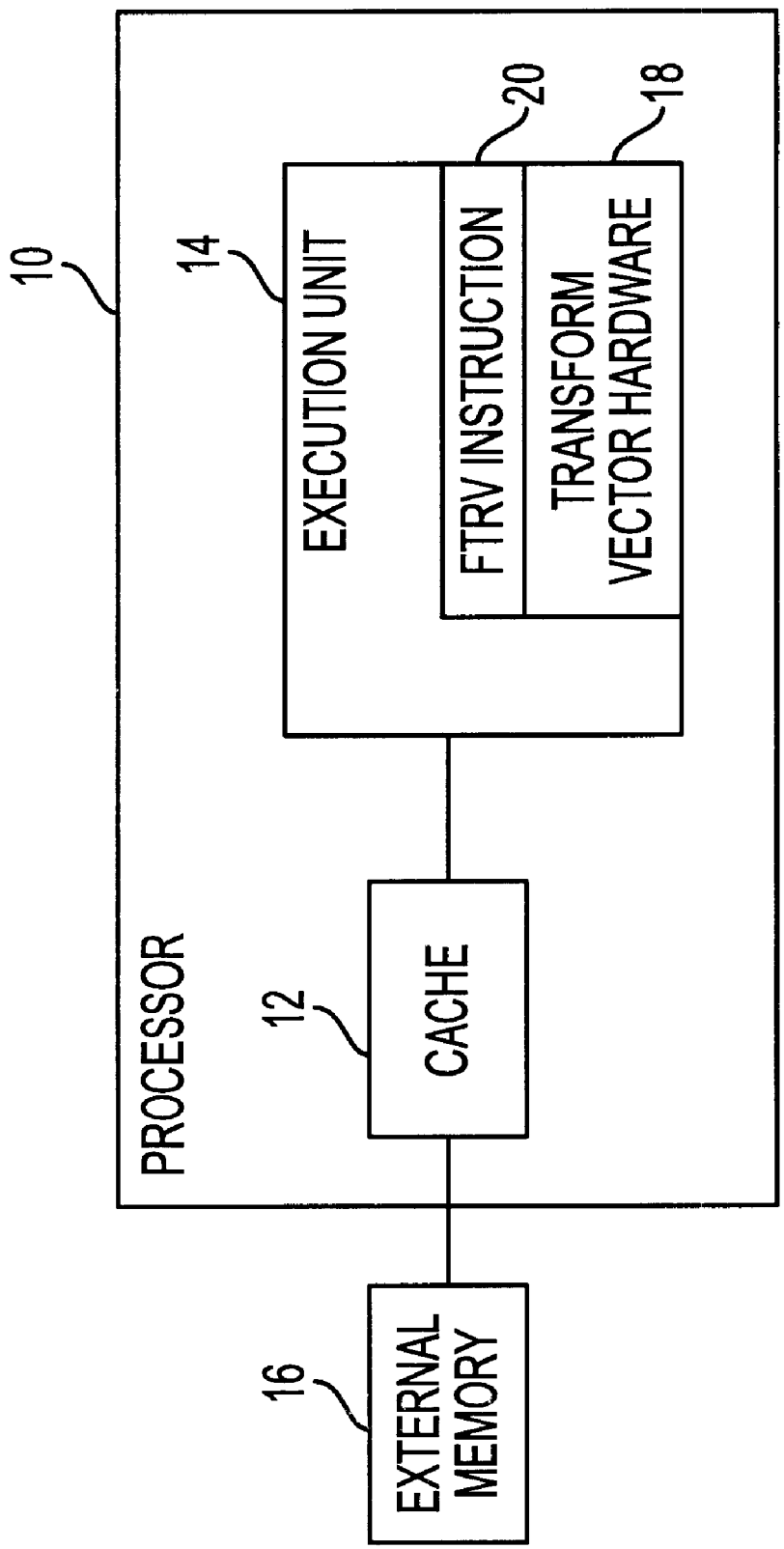
FIG. 1 is a block diagram of a processor and memory.

FIG. 1 is a block diagram of a processor 10 and memory 16 suitable for use with the present invention. In this example, the processor 10 is a two-way superscalar general-purpose microprocessor having a clock speed of 200 MHz. However, the use of this invention is not limited to this process or this particular type of processor.

The processor 10 has a cache 12 that supplies instructions and data to an execution unit 14. The cache 12 retrieves instructions and data from an external memory 16. In an alternate embodiment, the memory 16 is on the same chip as the processor 10. The execution unit 14 has transform vector hardware 18 and implements a matrix-vector multiply instruction (FTRV) 20 using the transform vector hardware 18.

Figure 2:
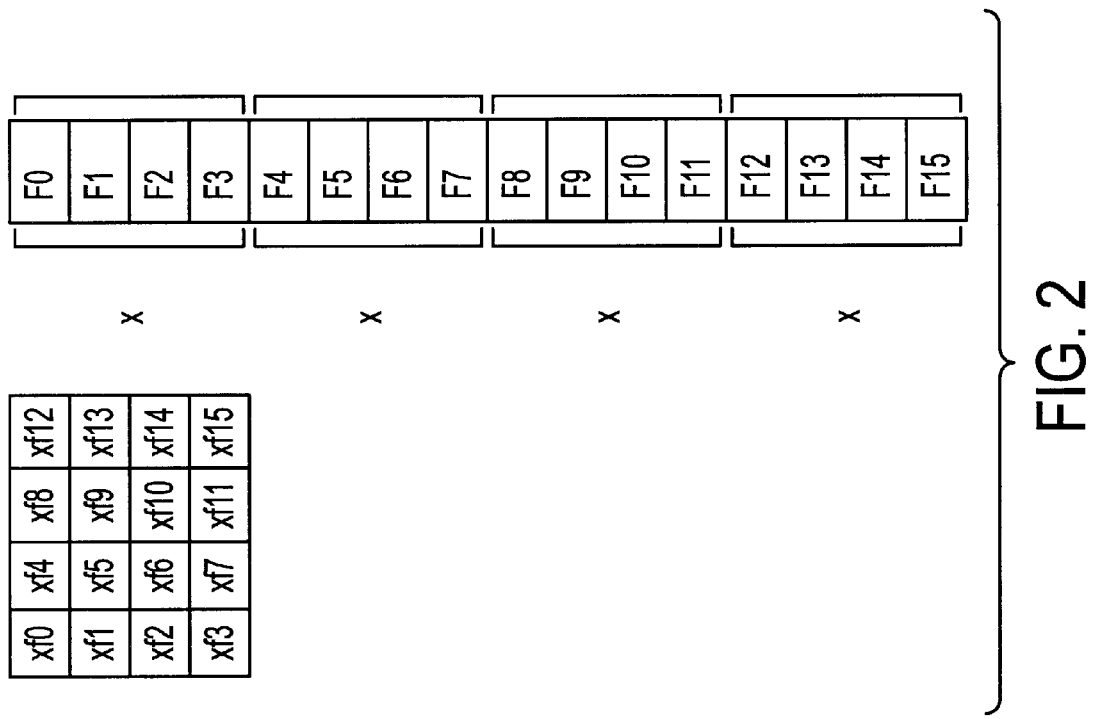
FIG. 2 shows the registers of the transform vector hardware of FIG. 1 in that are used in connection with the matrix-vector-multiply instruction.

FIG. 2 shows the registers of the transform vector hardware of FIG. 1 that are used with the FTRV instruction. A set of coefficients for a 4×4 matrix is stored in the matrix registers XF0–XF15. A set of coefficients for four 4×1 vectors are stored in the vector registers F0–F15. The vector registers are grouped as follows to form the four 4–1 vectors: F0–F3, F4–F7, F8–F11 and F12–F15. The FTRV instruction multiplies the coefficients stored in the matrix registers with a designated one of the 4×1 vectors and stores the result in the designated 4×1 vector register. The results of the FTRV operation are shown below.

| 4 × 4 Matrix Registers | | | | Designated Vector Register | Result: Vector Register |
|---|---|---|---|---|---|
| xf0 | xf4 | xf8 | xf12 | F0 | xf0 × F0 + xf4 × F1 + xf8 × F2 + xf12 × F3 |
| xf1 | xf5 | xf9 | xf13 | × F1 = | xf1 × F0 + xf5 × F1 + xf9 × F2 + xf13 × F3 |
| xf2 | xf6 | xf10 | xf14 | F2 | xf2 × F0 + xf6 × F1 + xf10 × F2 + xf14 × F3 |
| xf3 | xf7 | xf11 | xf15 | F3 | xf3 × F0 + xf7 × F1 + xf11 × F2 + xf15 × F3 |

The matrix and vector registers store single-precision floating point values. The FTRV instruction performs sixteen floating point multiplies and twelve floating point adds, can be issued every four cycles and has a latency of seven cycles.

Figure 3:
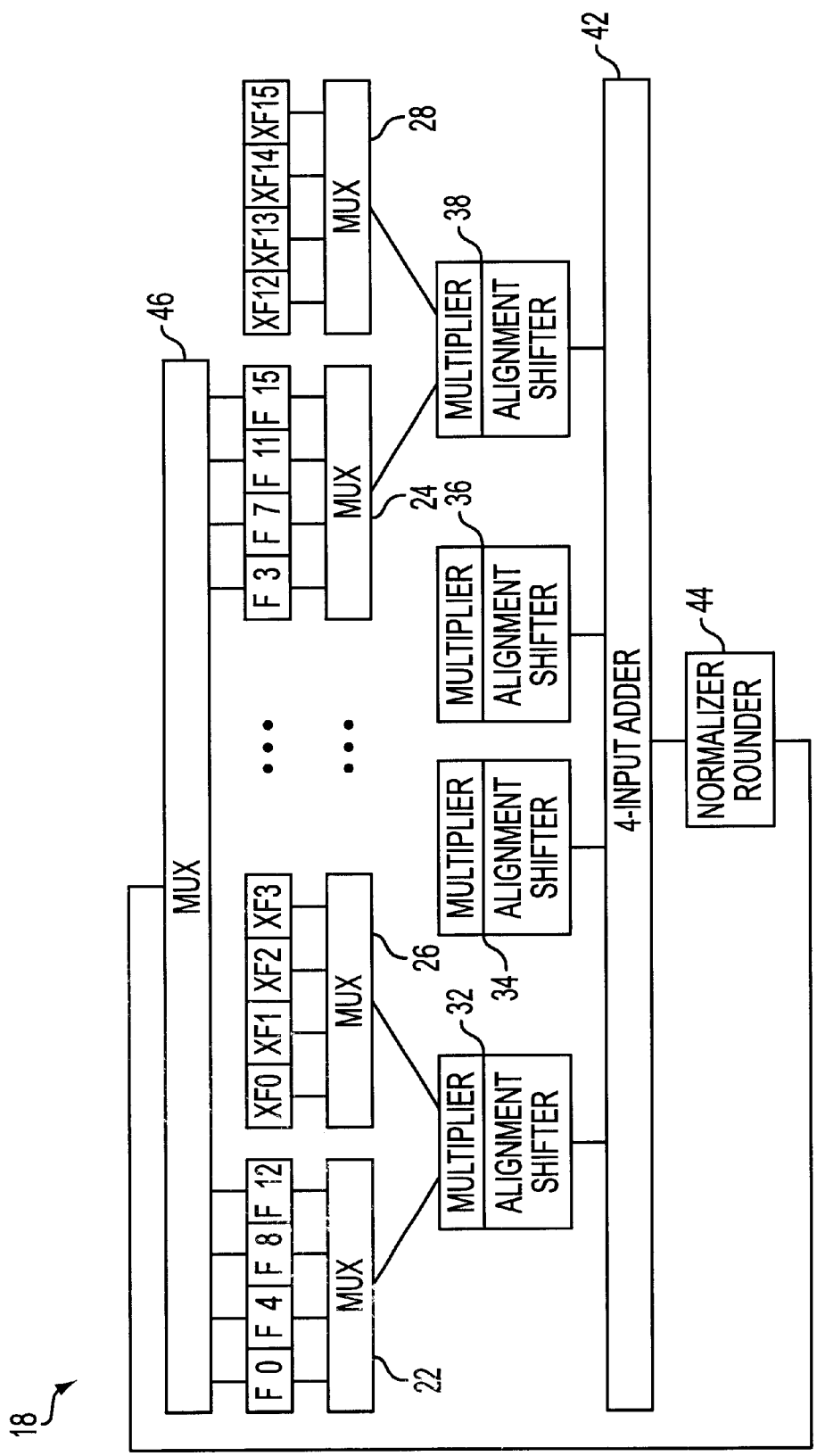
FIG. 3 is a detailed diagram of the transform vector hardware of FIG. 1 that is used to perform the matrix-vector-multiply instruction.

FIG. 3 is a detailed diagram of the transform vector hardware 18 of FIG. 1 that is used to perform the matrix vector multiply instruction. The vector registers F0–F15 are grouped and each group is connected to a multiplexor 22, 24. The matrix registers xf0–xf15 are also grouped and each group is also connected to a multiplexor 26, 28. The multiplexors 22–28 from the vector and matrix registers are paired and input to a multiplier-alignment-shifter 32–38. The outputs of the multiplier-alignment-shifters 32–38 are summed by an adder 42. A normalizer-rounder 44 normalizes the output of the adder 42, if desired, and another multiplexor 46 routes the normalized output to the one of the vector registers that supplied the input data. For example, for an FTRV F0 instruction, register F0 will contain xf0×F0+ xf4×F1+xf8×F2+xf12×F3. When pipelined, the transform vector hardware performs four floating-point multiplies and additions per clock cycle.

By definition, the discrete Fourier transform (DFT) is determined as follows:

$$X(k) = \sum_{n=0}^{N-1} X(n)W_N^{nk}, \text{ for } k = 0 \text{ to } N-1, \text{ where } W_N = e^{-j2\pi/N}.$$

The DFT requires $N^2$ complex multiplications and $N^2$ complex additions. The FFT operation is a more efficient way of computing the DFT. To improve computational efficiency, the FFT mathematically reduces the DFT to a series of operations, called butterfly operations, between pairs of input points. The butterfly is the core operation of the FFT.

However, the matrix vector multiply instruction was designed for 3-D graphics and cannot be directly used by the FFT because the butterfly operation requires a different number and different ordering of the multiply and adds as compared to the matrix vector multiply instruction. A noteworthy aspect of the invention is the use of the matrix vector multiply instruction (FTRV) and related hardware to implement a Cooley-Tukey algorithm for an FFT and in particular the "butterfly" operation of the FFT.

Figure 4:
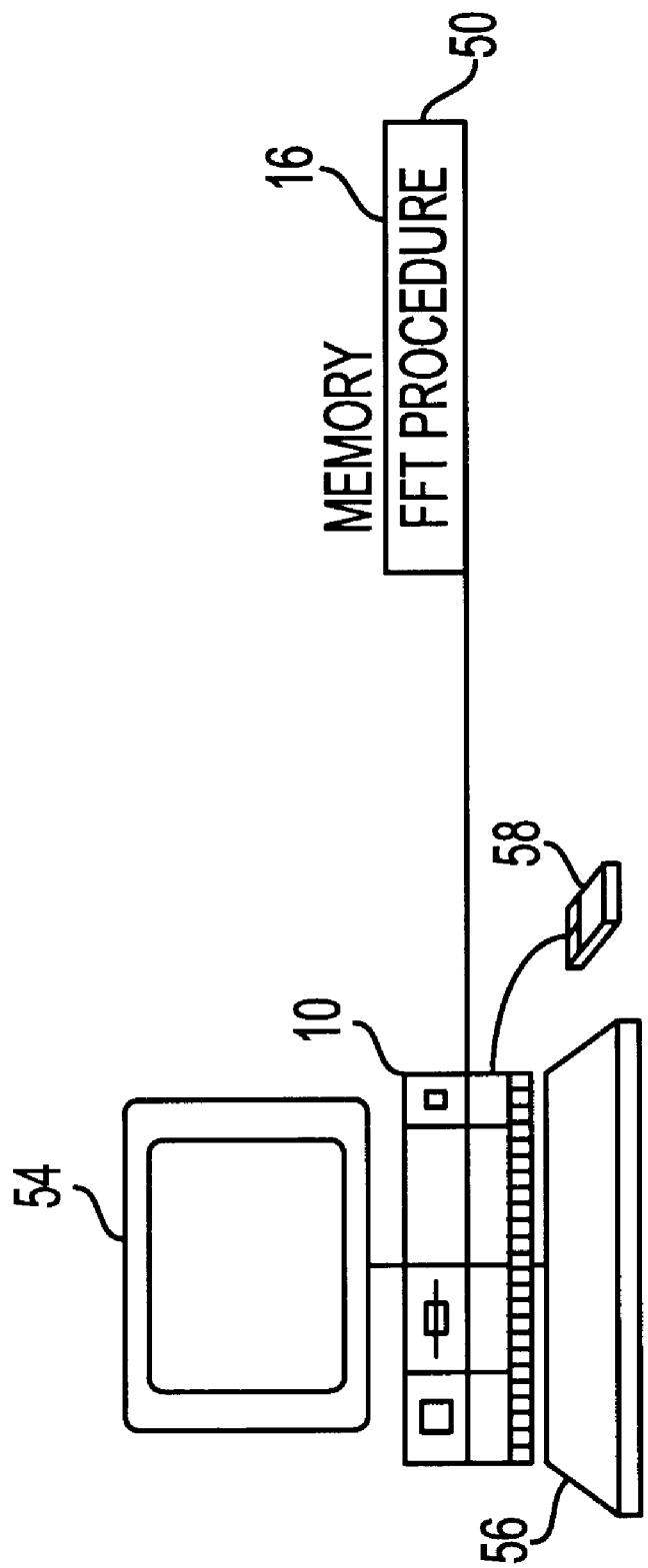
FIG. 4 shows a computer system and memory storing procedures that use the matrix-vector-multiply instruction.

FIG. 4 shows a computer system and memory storing procedures that use the FTRV instruction. The processor 10 connects to the memory 16 that stores an FFT procedure 50 that uses the FTRV instruction. The processor 10 also connects to a display 54, a keyboard 56 and a mouse 58.

Figure 5:
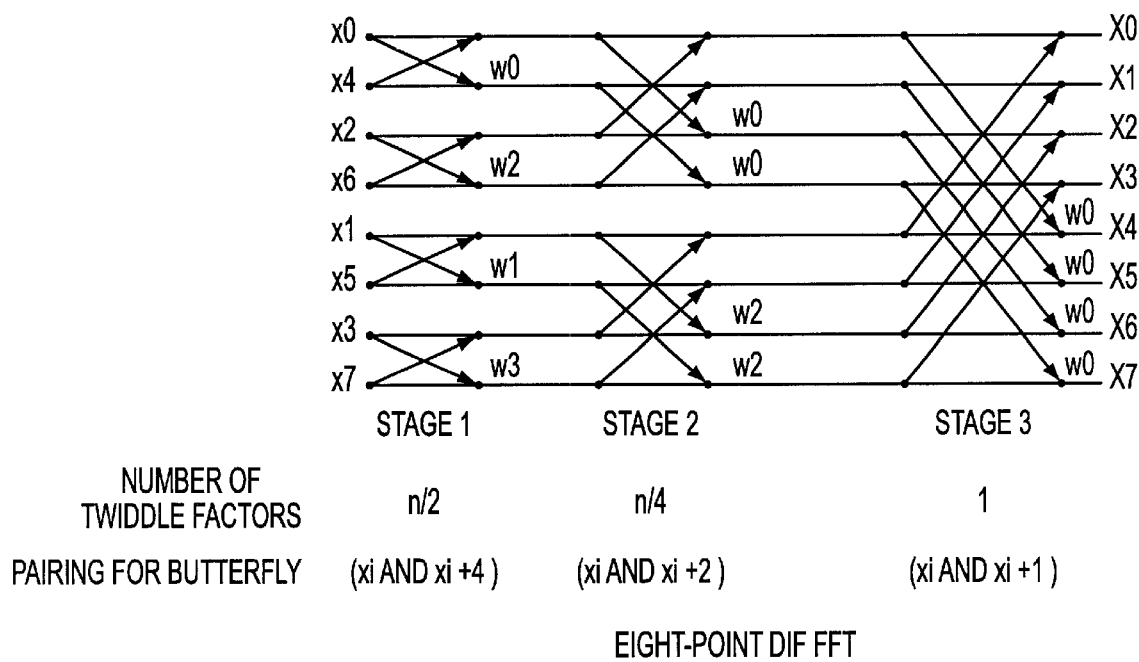
FIG. 5 shows the three stages of an eight-point decimation in frequency fast fourier transform using the matrix-vector-multiply instruction to perform the butterfly operation.

FIG. 5 is a flow diagram of the three stages of an eight-point decimation in frequency FFT operation using the matrix-vector multiply instruction of the present invention. The input points are designated as xthrough x7, and the output points are designated as X0 through X7.

In FIG. 5, the crossed arrows between pairs of input points designate the pairing of the input points for each butterfly operation. The FFT is performed in a series of stages, and each stage applies a series of butterfly operations to generate a set of outputs which are used by the next stage. Each stage performs the same number of butterfly operations. The entire FFT is performed by combining butterflies in patterns determined by the type of FFT performed.

The butterfly operation in a radix-2 FFT includes four multiplies and six addition/subtractions. The term "radix-2" refers to how the input points are divided at each stage. A radix-2 FFT divides the input samples into two sets, which are repeatedly divided into two more subsets until the subsets have two input points.

Note that, in stage one, the input points for the butterfly operations are not paired consecutively in numerical order, while the output points of stage three are ordered numerically.

In the computation of the DFT, multiples of $W_N$, which equal $e^{-j2\pi/N}$ in the DFT equation described above, become coefficients in the FFT operation. The multiples of Wn are called twiddle factors and the twiddle factor (W0, W1, W2 and W3) for each butterfly operation is shown next to the downward pointing arrow. In stage one, each pair of input points uses a different twiddle factor. For example, in stage 1, the butterfly operation is performed on points x0 and X4 using the twiddle factor W0.

In stage two, the output points of stage one are paired and two twiddle factors, W0 and W2 are used for the butterfly operation. In stage 3, the output points are paired and a single twiddle factor W0 is used for all butterfly operations. FIG. 5 also shows the number of twiddle factors for each stage.

As stated above, the input points x0 through x7 are complex numbers. A complex number has a real portion and an imaginary portion, and is represented using the notation: a+j b, where a is the real portion and jb is the imaginary portion. Factors "a" and "b" are real numbers; j is an imaginary number. A complex addition and multiplication refers to the multiplying or adding complex numbers. The FFT can be either a decimation in frequency (DIF) FFT or a decimation in time (DIT) FFT.

Figure 6:
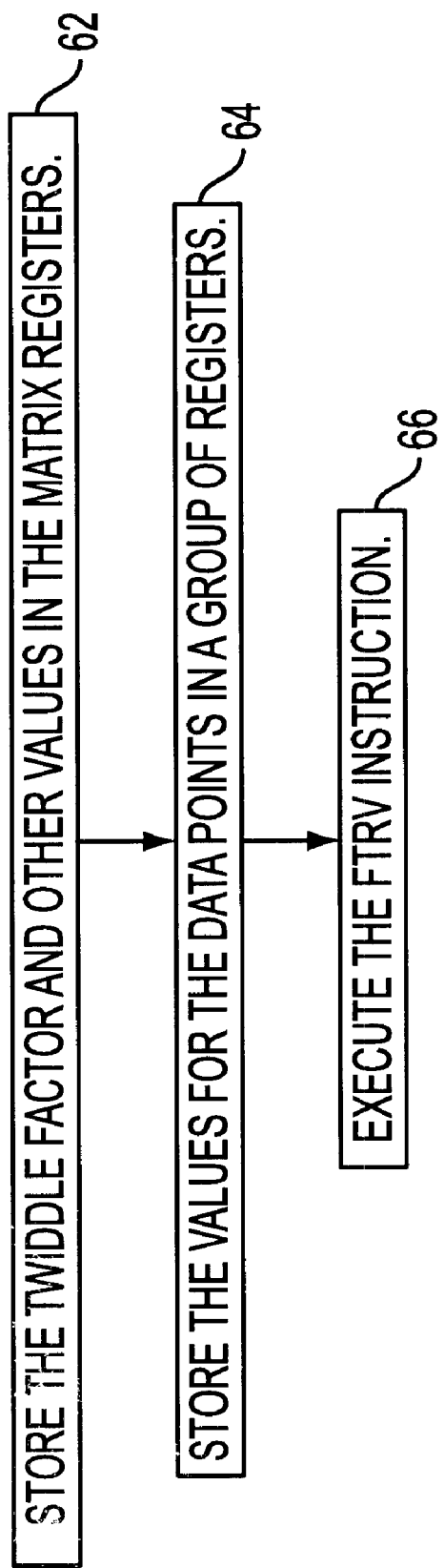
FIG. 6 is a flowchart of the butterfly operation using the matrix-vector multiply instruction.

FIG. 6 is a flowchart of the butterfly operation of the present invention. In step 62, the twiddle factors and other values are loaded and stored in the matrix registers. Step 64 stores the values for the input points in at least one of the groups of vector registers. In step 66, the matrix vector multiply (FTRV) instruction is executed. The butterfly operation for a Decimation in frequency radix-2 FFT is defined as follows. The two input points are defined as r1+j.i1 and r2+j.i2. The twiddle factor for the butterfly operation has the form $Wn=e^{-j2\pi/N}=\cos(2\pi/N)-j\sin(2\pi/N)$ and is defined as a+j.b, where $b=-\sin(2\pi/N)$. The outputs of the butterfly operation are generated by applying the following relationship:

(r1+r2)+j (i1+i2)

((r1−r2) a−(i1−i2) b)+j ((r1−r2) b+(i1−i2) a)).

To perform the radix-2 DIF butterfly, described above, using the FTRV instruction, the 4×4 matrix register and the vector registers are loaded with and store the following values:

| 4 × 4 Matrix | | | | Input Vector Register | Result Vector Register | |
|---|---|---|---|---|---|---|
| 1 | 0 | 1 | 0 | r1(F0) | r1 + r2 | (F0) |
| 0 | 1 | 0 | 1 | × i1(F1) | = i1 + i2 | (F1) |
| a | −b | −a | b | r2(F2) | (r1 − r2)a − (i1 − i2)b | (F2) |
| b | a | −b | −a | i2(F3) | (r1 − r2)b + (i1 − i2)a | (F3) |

The particular vector registers are shown in parentheses next to the coefficient.

The twiddle factors W include coefficients a, b, −a and −b and are stored in the bottom two rows of the 4×4 matrix registers. The values and coefficients of the 4×4 matrix above are stored in the matrix registers in the same format as shown in FIG. 2. For example, xf0 stores 1, xf4 stores 0, xf1 stores 0, xf2 stores a, and xf15 stores −a. In the vector register, F0 stores r1, F1 stores i1, F2 stores r2 and F3 stores i2. The FTRV F0 instruction is then executed on registers F0–F3. After executing the FTRV F0 instruction, the results are stored in the vector registers F0–F3. For example F0 stores r1+r2, F1 stores i1+i2, F2 stores (r1−r2)a−(i1−i2)b and F3 stores (r1−r2)b+(i1−i2)a. As a result, the entire butterfly operation for a radix-2 FFT is performed using a single matrix vector multiply (FTRV) instruction.

In an alternate embodiment, vector registers F4–F7 store r1, i1, r2 and i2, respectively, and an FTRV F4 instruction is executed. Similarly, vector registers F8–F11 and F12–F15 can be used with FTRV F8 and FTRV F12 instructions, respectively.

The radix-2 DIT FFT butterfly operation is performed by initializing the 4×4 matrix registers and vector registers to generate the result in the vector registers as shown below:

| 4 × 4 Matrix | | | | Input Vector Register | Result Vector Register |
|---|---|---|---|---|---|
| 1 | 0 | a | −b | r1 | r1 + r2 |
| 0 | 1 | b | a | × i1 = | i1 + i2 |
| 1 | 0 | −a | b | r2 | (r1 − r2)a − (i1 − i2)b |
| 0 | 1 | −b | −a | i2 | (r1 − r2)b + (i1 − i2)a |

The twiddle factors W are stored in the two rightmost columns of the 4×4 matrix registers.

The coefficients of the twiddle factors W are precomputed and stored in a twiddle factor table in memory. Ideally, the twiddle factor table stores each twiddle factor W as two floating point numbers, a and b. However, in practice, the twiddle factor table stores all eight values of the coefficients of the bottom two rows for a DIF FFT or rightmost columns for a DIT FFT.

Software Pipelining

The FTRV instruction can be executed every four cycles. During the four cycles, the execution unit can execute two double-precision loads and two double precision stores of the vector registers in parallel with the FTRV instruction. Since the FTRV instruction has a latency of seven cycles, software pipelining is used to achieve a peak throughput of four cycles per butterfly operation. Pseudocode for the software pipelining is shown below. To explain software pipelining, the third FTRV instruction, "FTRV F8", will be described in detail. Note that the FTRV F0 instruction completed execution prior to executing the FTRV F8 instruction. In parallel with the "FTRV F8" instruction, the result of the FTRV F0 instruction is stored in memory using a double store instruction such as "Dbl_st address0, F0" which stores the values in F0 and F1 in address0 and address0+1, respectively. A double load instruction, such as "Dbl_ld address n, F0", loads the values stored at address n and address n+1 into F0 and F1, respectively. For simplicity, the pseudocode below does not specify an address even though an address will be specified in practice.

PseudoCode for Pipelining the Butterfly Operation

```
Innermost_Loop: {
            FTRV F0 in parallel with    Dbl_st F8
                                        Dbl_st F10
                                        Dbl_ld F8
                                        Dbl_ld F10
            FTRV F4 in parallel with    Dbl_st F12
                                        Dbl_st F14
                                        Dbl_ld F12
                                        Dbl_ld F14
            FTRV F8 in parallel with    Dbl_st F0
                                        Dbl_st F2
                                        Dbl_ld F0
                                        Dbl_ld F2
            FTRV F12 in parallel with   Dbl_st F4
                                        Dbl_st F6
                                        Dbl_ld F4
                                        Dbl_ld F6
}
```

Prior to beginning execution of "Innermost_Loop" above, instructions are executed to initialize the vector registers F0–F7 and matrix registers as described above. After the "Innermost_Loop" completes execution, additional instructions are used to store the values of F8–F15 in memory. In addition, other instructions that decrement a loop counter and branch to the beginning of "Innermost_Loop" with respect to the value in the loop counter are executed in parallel with the double load and double store instructions.

Consequently, pipelining the FTRV instruction used to perform the butterfly operation with load and store operations further increases the speed of performing the FFT.

Grouping Butterfly Operations

The speed of the FFT is further improved by performing butterfly operations on those inputs that use the same twiddle factor to reduce the number of times that the matrix registers are loaded. The radix-2 FFT has $\log_2 N$ stages and each stage has N/2 butterfly operations. For a DIF FFT, in all but the first stage, twiddle factors are used more than once. (See FIG. 4) The twiddle factor is used 1, 2, 4, ..., N/2 times in stages 1, 2, 3, ..., $\log_2 N$, respectively. To improve throughput, the butterfly operations are grouped together in each stage to reuse an already loaded twiddle factor. The pseudocode is shown below:

Pseudocode for grouping butterfly operations that use the same twiddle factor.

```
For (i=1 to Number_of_Stages) {
    for (j=1 to Number_of_Twiddle_Factors_in_Stage_i){
        load new twiddle factor
        for (k=1 to Number_of_same_twiddle_factor_butterflies_in_stage_i){
            execute same_twiddle_factor_butterfly /*executes a single FTRV instruction
        }
    }
}
```

Figure 7:
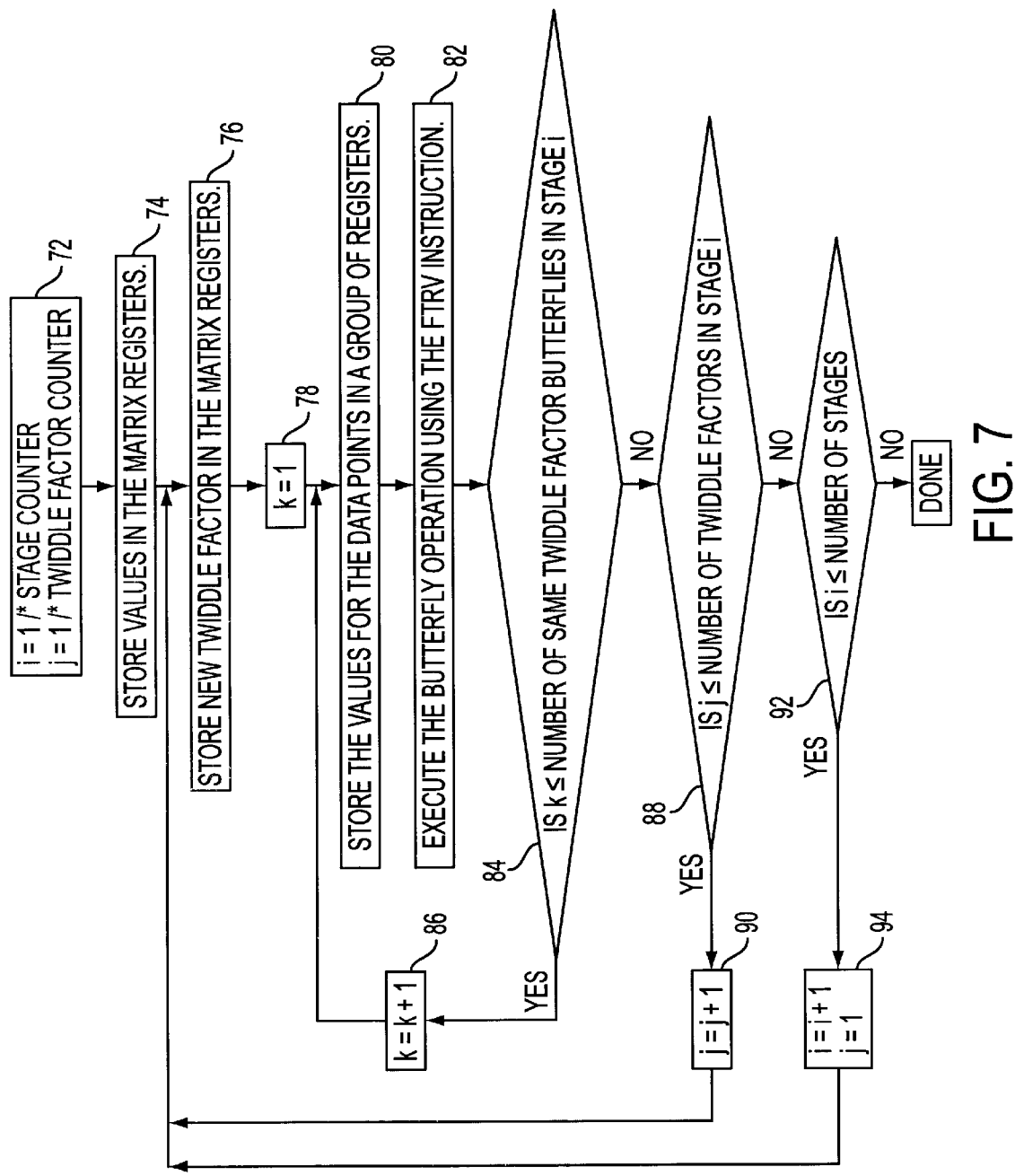
FIG. 7 is a flowchart of an FFT procedure using the matrix-vector-multiply instruction to perform butterfly operation.

FIG. 7 is a flowchart of the pseudocode above. Step 72 initializes i and j, a stage counter and twiddle factor counter, respectively, to one. Step 74 stores the constants in the matrix registers. Step 76 stores the new twiddle factor in the matrix registers. In step 78, the counter for the innermost loop, k, is initialized to one. Step 80 stores the values for the input points in one of the groups of registers. In step 82, the butterfly operation is executed using the FTRV instruction. Step 84 determines if k is less than or equal to the number of butterflies using the same twiddle factor in that stage. If so, step 86 increments k and proceeds to step 80. If not, step 88, determines if j, the twiddle factor counter, is less than or equal to the number of twiddle factors in stage i. If so, step 90 increments j and proceeds to step 46. If not, step 92 determines if i is less than or equal to the number of stages. If so, step 94 increments i, sets j equal to one and proceeds to step 96 to perform butterflies for the next stage. If not, the procedure ends.

To further improve the speed of the FFT operation, FTRV instructions are pipelines for stages three and greater. In FIG. 7, the innermost loop which executes the same_twiddle_factor_butterfly waits until each FTRV instruction is complete, and does not pipeline FTRV instructions. Since stages one and two only have one and two butterflies which use the same twiddle factor, separate procedures are executed for stages one and two. The following pseudocode pipelines FTRV instructions for stages three and greater.
Pseudocode for pipelining

```
Do Butterflies for stage 1;
Do Butterflies for stage 2;
For (i=3 to Number_of_Stages) {
    for (j=1 to Number_of_Twiddle_Factors_in Stage_i){
        load new twiddle factor
        for (k=1 to Number_of_same_twiddle_factor_butterflies_in_stage_i){
            execute same_twiddle_factor_butterfly
            execute same_twiddle_factor_butterfly
            execute same_twiddle_factor_butterfly
            execute same_twiddle_factor_butterfly
        }
    }
}
```

Figure 8:
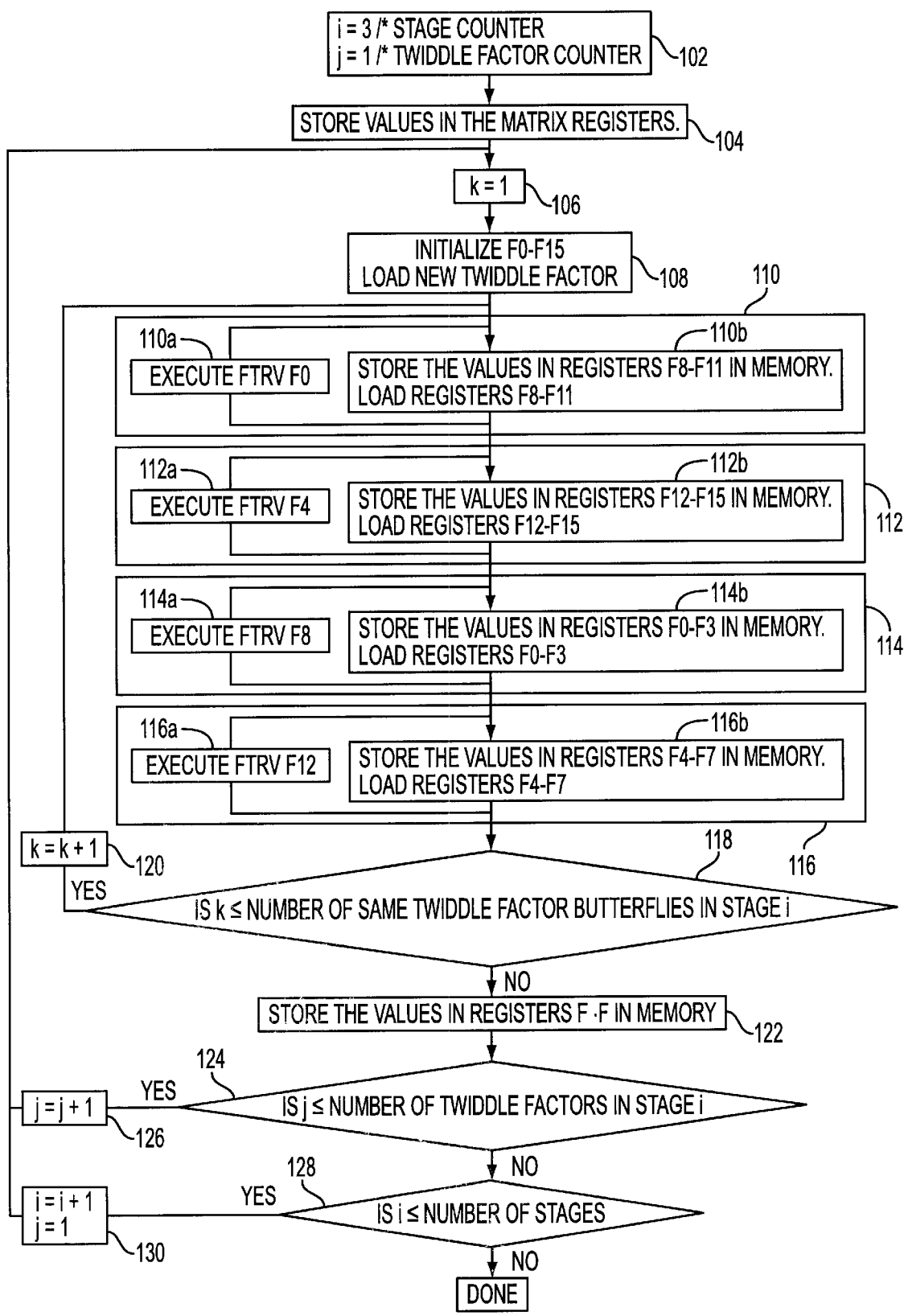
FIG. 8 is a flowchart of another embodiment of an FFT procedure using the matrix-vector-multiply instruction to perform the butterfly operation.

FIG. 8 is a flowchart of the embodiment of the FFT operation shown in the pseudocode above for stages three and higher. In step 102, a stage counter, i, is initialized to three and the twiddle factor counter, j, is initialized to one. Step 104 stores the constant values, zero and one, in the matrix registers. In step 106, the same_twiddle_factor counter, k, is initialized to one. In step 108, the vector registers F0–F15 loaded with the appropriate coefficients, r1, i1, r2 and i2, and the new twiddle factor is loaded in the matrix register. Blocks 110–116 execute the FTRV instruction (110*a*–116*a*) in parallel with the store and load instructions (110*b*–116*b*), and pipeline the execution of the butterflies. Step 118 determines if k is less than or equal to the number of the same twiddle factor butterflies in that stage. If so, then step 120 increments k and proceeds to step 110. If not, step 122 stores the results of the FTRV F8 and FTRV F12 instructions of steps 114 and 116, respectively, in memory. Step 124 determines if j is less than the number of twiddle factors in stage i. If so, step 126 increments j and proceeds to step 106. If not, step 128 determines if i is less than or equal to the number of stages. If so, then step 130 increments i, sets j equal to one, and proceeds to step 106. If not, the procedure ends.

As a result, pipelining and grouping of butterfly operations as described above increases the speed of FFT operation.

In an alternate embodiment, to further increase throughput, twiddle factors are reused between stages. The butterfly operations are ordered such that the twiddle factors for the last butterfly operation in a stage are used for the first butterfly operation in the next stage.

In the processor architecture, a branch is always predicted as being taken, so that a branch only takes one cycle. Furthermore, the branch instruction can often be paired with another instruction so that the branch does not use extra cycles. Thus, the number of instances of "branch not taken" in the innermost loop for the butterflies for stages one and two can be reduced. In stage one, since the innermost loop is always executed once per invocation, the pseudocode shown below removes the innermost loop and improves the speed of the FFT implementation of the present invention.
Pseudocode for Stage 1

```
for (j=1 to Number_of_Twiddle_Factors_in_Stage_1){
    load new twiddle factor
    execute same_twiddle_factor_butterfly
}
```

The "for" loop above will be executed N/2 times to perform the N/2 butterfly operations of stage one. For stage two, since each twiddle factor is used twice, a similar version of the loop can be used as shown in the pseudocode below.

Pseudocode for Stage 2

```
for (j=1 to Number_of_Twiddle_Factors_in Stage_2){
    load new twiddle factor
    execute same_twiddle_factor_butterfly
    execute same_twiddle factor_butterfly
}
```

The "for" loop above will be executed N/4 times to perform the N/2 butterfly operations of stage one.
Sequence of Input Points To further increase the speed of performing the FFT operation, the input points are bit-reversed. Rearranging the sequence of the input or output points is called bit-reversing. Bit-reversing can be done on the input points before starting the FFT or on the output points after the FFT is complete. Register R0 stores the address of the input points to load from memory. The processor has a post-increment addressing mode for loading registers; therefore, incrementing register R0 does not require additional instructions or cycles. For a DIF FFT that uses bit-reversing, the input points for consecutive butterfly operations that use the same twiddle factor are stored in consecutive memory addresses. Therefore, the address register R0 is post-incremented to point to the next address storing the next set of input points. In contrast, if the input points were ordered linearly, a separate Add instruction would be needed to increment address register R0 by adding offset values which vary from stage to stage. In addition, when using bit-reversing, the twiddle factors are precalculated and stored in the twiddle factor table in the bit-reversed sequence. Therefore, the twiddle factors are also accessed sequentially by post-incrementing an address register.

Bit-reversing is done using a precomputed bit reverse table. In one embodiment, a bit reverse table, called Reverse_Bit[i], of size N indicates for each index i, the value of i in a bit reversed sequence. The pseudocode for using such a table is shown below:

Pseudocode for a first embodiment of a bit reverse table.
define SWAP(a,b,tmp) tmp=(a); (a=b); (b)=tmp;

```
for (i=0; i<N; i++){
    j=Reverse_Bit[i];
    if(i<j) {
        SWAP(Data_Array[i], Data_Array[j], tmp);
        SWAP(Data_Array[i+1], Data_Array[j+1], tmp);
    }
}
```

In a second embodiment, the size of a bit reverse table is reduced. In this embodiment, a bit reverse table, called Bit_Rev_Pairs[i], stores ordered pairs (i,bri) where bri is the value of i with its bits reversed. In other words, input point i would be swapped with input point bri in memory. However, certain points need not be swapped or reordered, and a swap should be performed only once between pairs. Therefore for an eight data point FFT, this bit reverse table will contain: (1,4), (3,6) and (0,0). The last entry (0,0) is used as an end of table indicator. Therefore, while the bit reverse table in the first embodiment stores eight values, the bit reverse table of the second embodiment stores six values and thereby uses less storage capacity. The pseudocode using the bit reverse table of the second embodiment is shown below.

Pseudocode Using a Bit-Reverse Table

```
/* This defines the bit reverse table */
Struct {
    unsigned short i; /* i */
    unsigned short bri; /* bit-reversed i */
}   Bit_Rev_Pairs[FFT_SIZE/2] /* This is the bit reverse table */
for (i=0; ((i<N/2) & (Bit_Rev_Pairs[i].i |=0; i++); i++){
    j=Bit_Rev_Pairs[i].i;
    k=Bit_Rev_Pairs[i].bri;
    SWAP(Data_Array[j].bri, Data_Array[k].bri, tmp);
    SWAP(Data_Array[j].i, Data_Array[k].i, tmp);
```

Prefetch of Twiddle Factors

In a preferred embodiment, the processor has a prefetch instruction which is used to load the eight values of the twiddle factors into the cache memory. Each time the twiddle factors are loaded into the matrix registers, the prefetch instruction is executed in the background to prefetch the next eight twiddle factor values. Each cache-line of the cache stores thirty-two bytes which is sufficient to store all eight values of the twiddle factors.

Advantages

An earlier version of the FFT which does not use the FTRV instruction uses ten cycles per butterfly, and thus needs about 10*N*logN=51,200 cycles for the butterflies of a 1,024 point FFT. In addition, this earlier version used the first embodiment of the bit reverse table described above which added about 5,000 cycles for a total of 56,200 cycles.

In contrast, the FFT of the present invention which uses the FTRV instruction with pipelining and the second bit reversal embodiment is estimated to be about 36% faster than the earlier version.

Other features and advantages of the present invention will become apparent to a person of skill in the art who studies the present invention disclosure. Therefore, the scope of this invention is to be limited only by the following claims.

What is claimed is:

1. A method for implementing a butterfly operation for a fast fourier transform operation in a processor, a first set of inputs to the butterfly operation being r1+j i1 and r2+j i2, and a twiddle factor Wn being designated as $Wn=e^{-j2\pi/N}=\cos(2\pi/N)-j\sin(2\pi/N)=a+jb$, the butterfly operation comprising the steps of:

storing r1, i1, r2 and i2 in a first set of registers;
storing the twiddle factor in matrix registers; and
executing a first matrix vector multiply operation between the matrix registers and the first set of registers.

2. The method of claim 1 wherein a second set of inputs to a second butterfly operation are r3+j i3 and r4+j i4, further comprising the steps of:

while executing the first matrix vector multiply operation, storing r3, i3, r4 and i4 in a second set of registers; and
executing a second matrix vector multiply operation between the matrix registers and the second set of registers.

3. The method of claim 2 further comprising the steps of:

while executing the second matrix vector multiply operation, storing the output of the first matrix vector multiply operation in a memory.

4. The method of claim 1 further comprising the steps of:

storing an output of the matrix vector multiply operation in a memory; and
reordering the stored output of the matrix vector multiply operation.

5. The method of claim 4 wherein the stored output is associated with a first position, and wherein the step of reordering uses a bit reverse table to reorder the stored output, the bit reverse table including the first position and an ordered position of the stored output.

6. The method of claim 1 wherein the matrix-vector multiply instruction is performed by a processor, wherein the matrix registers form an n×n matrix and the first set of registers is a subset of a second set of registers forming a m×1 matrix organized into groups of registers, each of the groups having n registers, the first set of registers being a group, wherein the matrix vector multiply instruction causes the values in the registers in the n×n matrix to be matrix multiplied against a designated one of the groups of registers, the results of the matrix vector multiply being stored in the designated one of the groups of registers, wherein the step of storing r1, i1, r2 and i2 in the first set of registers stores the values as:
r1
i1
r2
i2;

wherein the step of storing the twiddle factor stores the twiddle factor as:

| | | | |
|---|---|---|---|
| 1 | 0 | 1 | 0 |
| 0 | 1 | 0 | 1 |
| a | −b | −a | b |
| b | a | −b | −a; | and the step of executing the matrix-vector multiply instruction with respect to the designated one of the groups of registers causes the following to be stored in the first set of registers:
r1+r2
i1+i2
(r1−r2)a−(i1−i2)b
(r1−r2)b+(i1−i2)a.

7. The method of claim 1 wherein the matrix-vector multiply instruction is performed by a processor, wherein the matrix registers form an n×n matrix and the first set of registers is a subset of a second set of registers forming a m×1 matrix organized into groups of registers, each of the groups having n registers, the first set of registers being a group, wherein the matrix vector multiply instruction causes the values in the registers in the n×n matrix to be matrix multiplied against a designated one of the groups of registers, the results of the matrix vector multiply being stored in the designated one of the groups of registers, wherein the step of storing r1, i1, r2 and i2 in the first set of registers stores the values as:
r1
i1
r2
i2;

the step of storing coefficients in the matrix registers stores the values as:

| | | | |
|---|---|---|---|
| 1 | 0 | a | −b |
| 0 | 1 | b | a |
| 1 | 0 | −a | b |
| 0 | 1 | −b | −a; | and the step of executing the matrix vector multiply instruction causes the following to be stored in the designated one of the groups of registers:
r1+(r2a−i2b)
i1+(r2b+i2a)
r1−(r2a−i2b)
i1−(r2b+i2a).

8. A method for implementing a butterfly operation for a fast fourier transform operation in a processor, including a plurality of consecutive inputs, a first set of inputs to the butterfly operation being r1+j i1 and r2+j i2, and a twiddle factor Wn being designated as $Wn=e^{-j2\pi/N}=\cos(2\pi/N)-j \sin(2\pi/N)=a+jb$, the butterfly operation comprising the steps of:

pairing the inputs such that the first set of inputs including r1+j i1 and r2+j i2 are not consecutive inputs;
storing r1, i1, r2 and i2 in a first set of registers;
storing the twiddle factor in matrix registers; and
executing a matrix vector multiply operation between the matrix registers and the first set of registers.

9. A system for performing a butterfly operation for a fast fourier transform operation, inputs to the butterfly operation being r1+j i1 and r2+j i2, and a twiddle factor Wn being designated as $Wn=e^{-j2\pi/N}=\cos(2\pi/N)-j \sin(2\pi/N)=a+jb$, comprising:

a first set of registers for storing r1, i1, r2 and i2;
matrix registers for storing the twiddle factor; and
an execution unit for executing a matrix vector multiply operation between the matrix registers and the first set of registers.

10. The system as claimed in claim 9,
wherein the matrix registers form an n×n matrix;
further comprising:

a second set of registers forming an m×1 matrix organized into groups of registers, each of the groups of registers having n registers, the first set of registers forming one group;
wherein the execution unit causes the values in the registers in the n×n matrix to be matrix multiplied against a designated one of the groups of registers, the results of the matrix vector multiply being stored in the designated one of the groups of registers;
a memory for storing a set of instructions that perform a butterfly operation including instructions that:
store values in the designated one of the groups of registers as:
r1
i1
r2
i2;
store coefficients in the first set of registers forming an n×n matrix as:

| | | | |
|---|---|---|---|
| 1 | 0 | 1 | 0 |
| 0 | 1 | 0 | 1 |
| a | −b | −a | b |
| b | a | −b | −a; | and perform a first matrix vector multiply with respect to the designated one of the groups of registers causing the following to be stored in the designated one of the groups of registers:
r1+r2
i1+i2
(r1−r2)a−(i1−i2)b
(r1−r2)b+(i1−i2)a.

11. The system as claimed in claim 10 further including instructions that:

load other values in another one of the groups of registers; and
perform a second matrix vector multiply with respect with respect to a different designated one of the groups of registers causing the following to be stored in the designated one of the groups of registers:
r1+r2
i1+i2
(r1−r2)a−(i1−i2)b
(r1−r2)b+(i1−i2)a.

12. The system as claimed in claim 11 wherein the instruction that performs the first matrix vector multiply is executed in parallel with the instruction that loads other values into another one of the groups of registers.

13. A computer program product for use in conjunction with a computer system, the computer program product comprising a computer readable storage medium and a computer program mechanism embedded therein, the computer program product for implementing a butterfly operation for a fast fourier transform operation in a processor, a first set of inputs to the butterfly operation being r1+j i1 and r2+j i2, and a twiddle factor Wn being designated as $Wn = e^{-j2\pi/N} = \cos(2\pi/N) - j\sin(2\pi/N) = a + jb$, the computer program mechanism comprising:

a program, stored in the storage medium, including a sequence of instructions, that store r1, i1, r2 and i2 in a first set of registers;

store the twiddle factor in matrix registers; and execute a first matrix vector multiply operation between the matrix registers and the first set of registers.

14. The computer program product of claim 13 wherein a second set of inputs to a second butterfly operation are r3+j i3 and r4+j i4, and further including instructions that:

while executing the first matrix vector multiply operation, store r3, i3, r4 and i4 in a second set of registers; and execute a second matrix vector multiply operation between the matrix registers and the second set of registers.

15. The computer program product of claim 14 further including instructions that:

while executing the second matrix vector multiply operation, store the output of the first matrix vector multiply operation in a memory.

16. The computer program product of claim 13 further including instructions that:

store an output of the matrix vector multiply operation in a memory; and reorder the stored output of the matrix vector multiply operation.

* * * * *